United States Patent
Tsuchida (10) Patent No.: US 12,425,729 B2
(45) Date of Patent: Sep. 23, 2025

(54) IMAGING APPARATUS FOR MULTI-PHOTOGRAPHY THAT DISPLAYS AN OBJECT ITEM CORRESPONDING TO AN OBJECT BEING FOCUSED BY ANOTHER IMAGING APPARATUS

(71) Applicant: CANON KABUSHIKI KAISHA, Tokyo (JP)

(72) Inventor: Naohiko Tsuchida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 160 days.

(21) Appl. No.: 18/050,293

(22) Filed: Oct. 27, 2022

(65) Prior Publication Data

US 2023/0136267 A1     May 4, 2023

(30) Foreign Application Priority Data

Oct. 29, 2021    (JP) ................. 2021-177841

(51) Int. Cl.
- *H04N 23/67* (2023.01)
- *H04N 23/611* (2023.01)
- *H04N 23/63* (2023.01)
- *H04N 23/667* (2023.01)
- *H04N 23/90* (2023.01)

(52) U.S. Cl.
CPC ........... *H04N 23/67* (2023.01); *H04N 23/611* (2023.01); *H04N 23/633* (2023.01); *H04N 23/667* (2023.01); *H04N 23/90* (2023.01)

(58) Field of Classification Search
CPC .............................................. H04N 23/61–611
See application file for complete search history.

(56) References Cited

U.S. PATENT DOCUMENTS

| | | | | |
|---|---|---|---|---|
| 2004/0227841 | A1* | 11/2004 | Houlberg | H04N 23/55 348/207.99 |
| 2007/0223901 | A1* | 9/2007 | Fujimoto | H04N 23/662 348/E5.043 |
| 2011/0096142 | A1* | 4/2011 | Kiyoshige | G02B 7/28 348/E7.091 |
| 2011/0216208 | A1* | 9/2011 | Matsuzawa | H04N 23/66 348/222.1 |
| 2013/0262588 | A1* | 10/2013 | Barak | H04L 51/52 709/204 |
| 2015/0029350 | A1* | 1/2015 | Matsuda | H04N 23/90 348/211.2 |
| 2016/0014320 | A1* | 1/2016 | Feltham | H04N 5/772 348/207.1 |

(Continued)

FOREIGN PATENT DOCUMENTS

| | | | |
|---|---|---|---|
| JP | 2011091607 A | 5/2011 |
| JP | 2015088985 A | 5/2015 |

(Continued)

*Primary Examiner* — Frank Johnson
(74) *Attorney, Agent, or Firm* — Canon U.S.A., Inc. IP Division (57) ABSTRACT

An imaging apparatus includes at least one memory and at least one processor which function as: an acquisition unit configured to acquire information on an object being focused by another imaging apparatus; and a control unit configured to perform control to display an object item corresponding to the object being focused by the other imaging apparatus on a basis of the information acquired by the acquisition unit.

13 Claims, 5 Drawing Sheets

(56) References Cited

U.S. PATENT DOCUMENTS

| | | | |
|---|---|---|---|
| 2017/0223261 A1* | 8/2017 | Shimizu | H01L 29/66613 |
| 2017/0295286 A1* | 10/2017 | Haneda | H04N 5/2628 |
| 2018/0205891 A1* | 7/2018 | Conway, Sr. | H04N 23/45 |
| 2021/0081093 A1* | 3/2021 | Yun | G06F 3/0482 |
| 2021/0281765 A1* | 9/2021 | Wu | H04N 23/61 |

FOREIGN PATENT DOCUMENTS

| | | |
|---|---|---|
| JP | 2015130653 A | 7/2015 |
| JP | 2020025248 A | 2/2020 |
| WO | 2016016984 A1 | 2/2016 |

* cited by examiner

IMAGING APPARATUS FOR MULTI-PHOTOGRAPHY THAT DISPLAYS AN OBJECT ITEM CORRESPONDING TO AN OBJECT BEING FOCUSED BY ANOTHER IMAGING APPARATUS

BACKGROUND

Technical Field

The present disclosure relates to an imaging apparatus and, in particular, to multi-photographing using a plurality of imaging apparatuses.

Description of the Related Art

In recent years, information transmission through the Internet or SNS is gaining momentum, and individuals are allowed to easily transmit contents. Under the circumstances, demands for multi-photographing in which photographing is performed using a plurality of imaging apparatuses in order to generate finer contents are increasing.

Multi-photographing is generally performed by photographers same in number as imaging apparatuses but may be performed by an individual according to a method in which automatic photographing is performed with a plurality of imaging apparatuses installed at prescribed positions, or the like. A function relating to automatic photographing includes an automatic tracking function to automatically track an object or the like. Japanese Patent Application Laid-open No. 2020-25248 discloses the remote operation of a plurality of imaging apparatuses, for example, the automatic operation of multi-photographing.

However, when multi-photographing is performed by one photographer, the photographer has to consider the photographing situation of another camera while operating one camera and is not allowed to easily perform the multi-photographing. Therefore, a case in which a desired object is not reflected in a photographed image or a case in which a desired object is not focused occurs frequently.

SUMMARY

The present disclosure provides a technique of allowing an individual to easily perform multi-photographing.

An imaging apparatus according to the present disclosure includes at least one memory and at least one processor which function as: an acquisition unit configured to acquire information on an object being focused by another imaging apparatus; and a control unit configured to perform control to display an object item corresponding to the object being focused by the other imaging apparatus on a basis of the information acquired by the acquisition unit.

Further features of the present disclosure will become apparent from the following description of exemplary embodiments with reference to the attached drawings.

DESCRIPTION OF THE EMBODIMENTS

Hereinafter, embodiments of the present disclosure will be described in detail on the basis of the accompanying drawings. Note that the present disclosure is not limited to the following embodiments but various deformations and modifications are possible within the scope of its gist.

Figure 1:
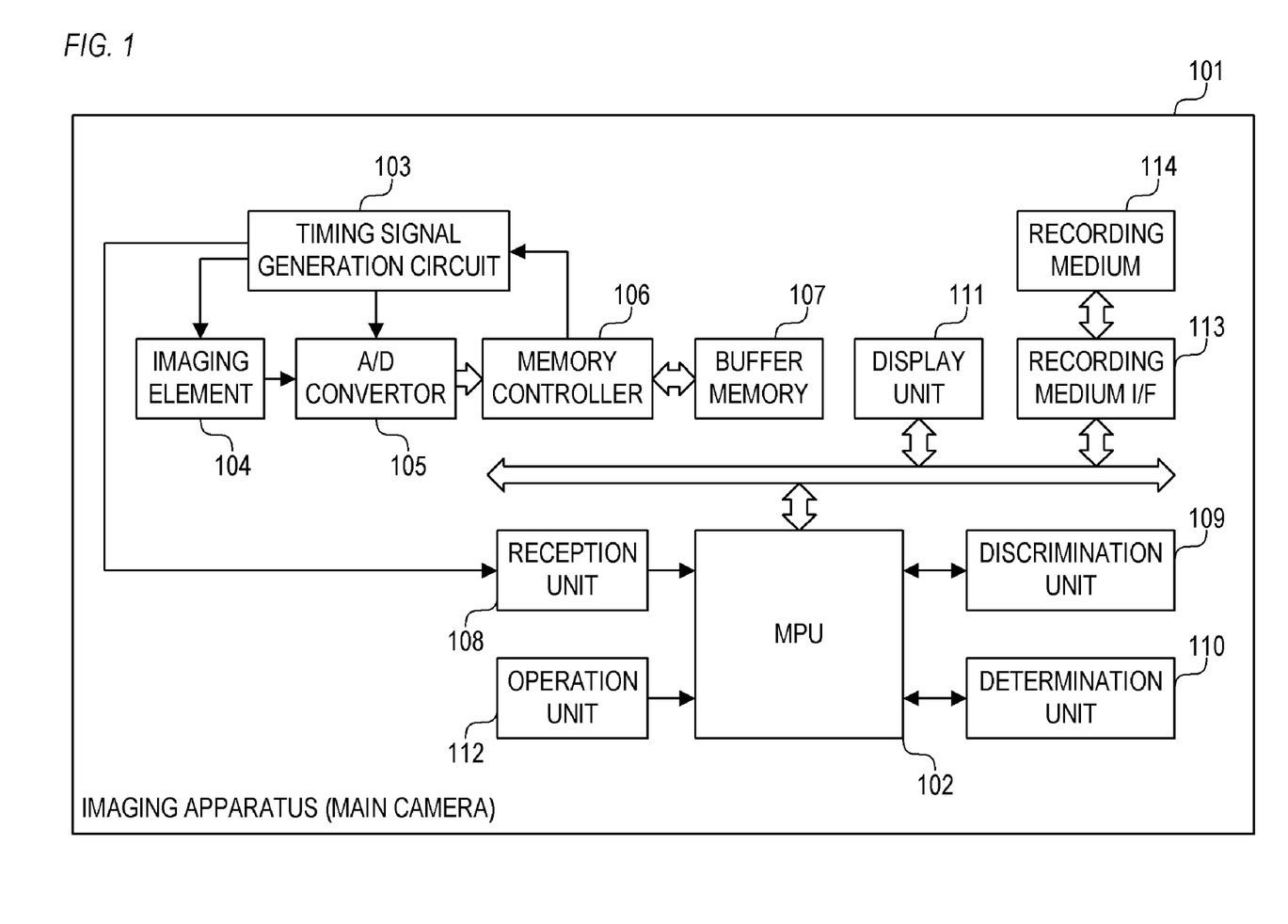
FIG. 1 is a block diagram showing a configuration example of a main camera.

FIG. 1 is a block diagram showing a configuration example of an imaging apparatus 101 according to the present embodiment. The imaging apparatus 101 is, for example, a camera (such as a digital camera and a digital video camera) or an electronic device including a camera function (such as a mobile phone including a camera function and a computer with a camera). The imaging apparatus 101 includes an MPU 102, a timing signal generation circuit 103, an imaging element 104, an A/D convertor 105, a memory controller 106, and a buffer memory 107. Moreover, the imaging apparatus 101 includes a reception unit 108, a discrimination unit 109, a determination unit 110, a display unit 111, an operation unit 112, a recording medium I/F 113, and a recording medium 114.

The MPU 102 is a micro controller for performing the various control of the imaging apparatus 101 such as photographing sequence control and controls the reception unit 108, the discrimination unit 109, the determination unit 110, the display unit 111, or the like.

The timing signal generation circuit 103 generates a timing signal necessary for operating the imaging element 104. The timing signal generation circuit 103 may generate a timing signal showing a timing at which the reception unit 108 receives information on the AF (Auto Focus) detection of other imaging apparatuses. The AF detection is detection as to whether an object is being focused.

The imaging element 104 is an imaging element such as a CCD and a CMOS that converts reflected light from an object into an electric signal.

The A/D convertor 105 converts an electric signal (analog image data) output from the imaging element 104 into digital image data.

The memory controller 106 controls the reading/writing of data in/from a memory, the refreshing operation of the buffer memory 107, or the like.

The buffer memory 107 stores image data.

The reception unit 108 receives the AF detection information (information on AF detection) of other imaging apparatuses. For example, when objects being focused by other imaging apparatuses exist, information on the objects (object information) is received as AF detection information. When no objects being focused by other imaging apparatuses exist, information showing that AF detection is not being performed is received as AF detection information. A reception timing may be freely set so as not to hinder other functions (such as an imaging function). For example, reception may be performed at all times, or may be performed when a photographer performs an arbitrary operation on the imaging apparatus 101. When reception is performed at all times, a reception timing is controlled by the timing signal generation circuit 103 as described above, whereby it is possible to perform reception without hindering the activation of other functions. The imaging apparatus 101 may be called a main camera, and other imaging apparatuses may be called sub-cameras. The main camera and the sub-cameras are imaging apparatuses used for multi-photographing.

The discrimination unit 109 discriminates objects corresponding to object information received by the reception unit 108. For example, the discrimination unit 109 discriminates whether objects are persons or objects other than the persons. The discrimination unit 109 may also discriminate face organs such as pupils, animals such as dogs, cats, and birds, vehicles such as automobiles, other objects, or the like.

The determination unit 110 determines, on the basis of objects discriminated by the discrimination unit 109, object items displayed to a photographer (a user of the imaging apparatus 101). The object items are display items corresponding to objects (object types) and are display items with which it is possible to discriminate the discrimination results (for example, discrimination as to whether objects are persons or objects other than the persons) of the discrimination unit 109. In terms of easiness in recognizing the discrimination results of the discrimination unit 109, the object items may be preferably icons or the like other than characters (the object items may be characters or the like). In the present embodiment, icons (object icons) are used as the object items.

The display unit 111 displays image data stored in the buffer memory 107, object items determined by the determination unit 110, or the like. The display unit 111 may be a look-in-type in-finder display or a rear display outside a finder. The display unit 111 may be a rear display (for example, a vari-angle system rear display) of which the posture relative to the body part of the imaging apparatus 101 is changeable, or a rear display of which the posture relative to the body part of the imaging apparatus 101 is fixed.

The operation unit 112 includes a power switch for turning ON/OFF the power of the imaging apparatus 101, a photographing start button, a mode switching button for switching an operation mode such as a camera mode (photographing mode) and a reproduction mode, or the like and receives an operation from a photographer (user). The operation unit 112 may include a touch panel.

The recording medium I/F 113 is an interface for controlling the reading/writing of data in/from the recording medium 114.

The recording medium 114 is a memory card, a hard disk, or the like and stores a program or the like.

Figure 2:
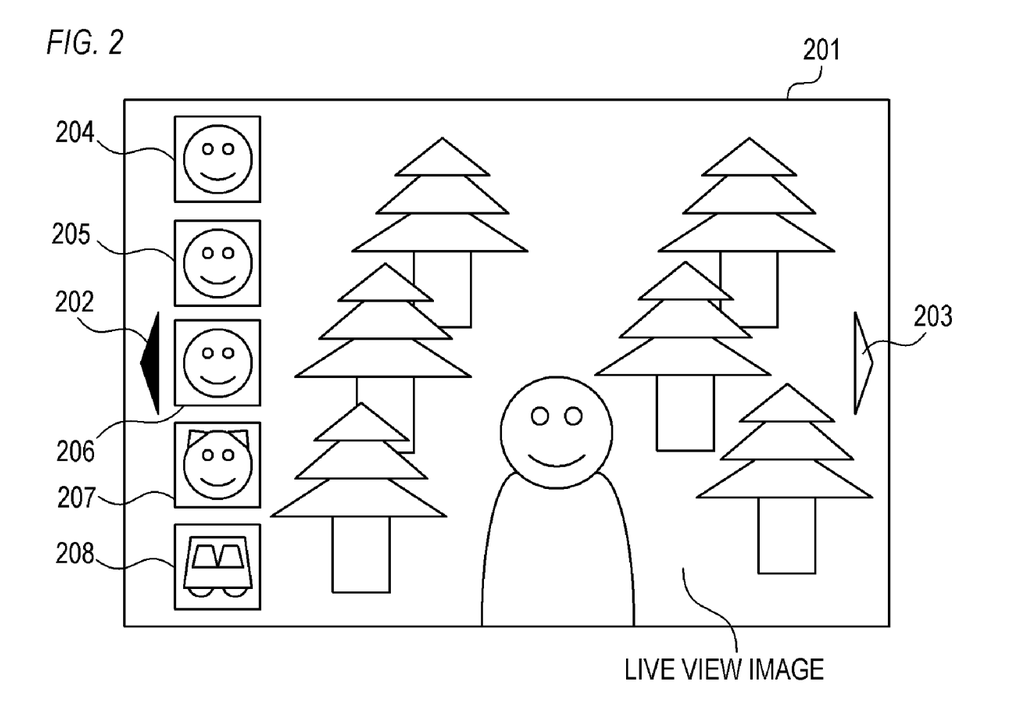
FIG. 2 is a schematic view showing an example of the display screen of the main camera.

FIG. 2 shows an example of a screen 201 (display screen) displayed by the display unit 111. FIG. 2 shows an example of a case in which two sub-cameras (a sub-camera 1 and a sub-camera 2) are used. Note that the number of the sub-cameras is not particularly limited and may be one or two or more. On the screen 201, information on the sub-cameras is displayed. On the screen 201, objects being photographed by the main camera (the imaging apparatus 101) (a live-view image showing objects in substantially real time) or the like are also displayed. The information on the sub-cameras is preferably displayed at the end or the like of the screen 201 so that the visibility of a live-view image of the main camera is not impaired.

On the screen 201, AF detection icons 202 and 203 are displayed. The AF detection icon 202 is a status item showing whether objects being focused by the sub-camera 1 exist, that is, whether AF detection is being performed by the sub-camera 1.

The AF detection icon 203 is a status item showing whether AF detection is being performed by the sub-camera 2. In the present embodiment, the AF detection icon 202 shows the situation of the AF detection of the sub-camera 1 in colors. For example, the AF detection icon 202 is displayed in black when AF detection is being performed by the sub-camera 1, and displayed in white when AF detection is not being performed by the sub-camera 1. Similarly, the AF detection icon 203 shows the situation of the AF detection of the sub-camera 2 in colors.

Through AF detection icons, a photographer (a user of the main camera) is allowed to easily grasp the situation of the AF detection of sub-cameras. In the present embodiment, the discrimination unit 109 determines whether AF detection is being performed by the sub-cameras on the basis of AF detection information on the imaging apparatuses of the sub-cameras. The determination unit 110 determines AF detection icons to be displayed on the basis of the discrimination results of the discrimination unit 109. Then, the display unit 111 displays the AF detection icons determined by the determination unit 110.

Note that the situation of AF detection may be made discriminable according to a difference in other modes such as the brightness, sizes, shapes, and display patterns (such as display at all times and blinking display) of AF detection icons. The situation of AF detection may be made discriminable according to a difference in the types of AF detection icons, the presence or absence of frames surrounding AF detection icons, or the like. The situation of AF detection may be made discriminable according to a difference in the colors, brightness, designs, or the like of frames surrounding AF detection icons. AF detection icons are preferably displayed in a mode in which sub-cameras corresponding to the AF detection icons are discriminable. Thus, a photographer is allowed to easily grasp the corresponding relationship between AF detection icons and sub-cameras even when the number of the sub-cameras is large.

When AF detection is being performed by a sub-camera, object icons corresponding to objects being focused by the sub-camera, that is, object icons corresponding to objects being AF-detected by the sub-camera are displayed in association with the AF detection icons of the sub-camera. In FIG. 2, AF detection is being performed by the sub-camera 1. Therefore, object icons 204 to 208 corresponding to objects being AF-detected by the sub-camera 1 are displayed in association with the AF detection icon 202. AF detection is not being performed by the sub-camera 2. Therefore, no object icons are displayed in association with the AF detection icon 203. When AF detection is being performed by the sub-camera 2, object icons corresponding to objects being AF-detected by the sub-camera 2 are displayed in association with the AF detection icon 203.

Through object icons, a photographer is allowed to easily grasp objects being AF-detected by sub-cameras. In the present embodiment, the discrimination unit 109 discriminates objects being AF-detected by sub-cameras on the basis of AF detection information on the imaging apparatuses of the sub-cameras. The determination unit 110 determines object icons to be displayed on the basis of the discrimination results of the discrimination unit 109. Then, the display unit 111 displays the object icons determined by the determination unit 110. Note that a photographer is allowed to grasp the situation of the AF detection of sub-cameras according to whether object icons are displayed. Therefore, AF detection icons may not be displayed.

The object icon 204 is a person icon corresponding to a person. The object icons 205 and 206 are registered-person icons corresponding to persons registered in advance by a main camera, a sub-camera, or the like. When objects are persons and specifically registered persons, object icons corresponding to the objects are displayed like the object icons 205 and 206. The object icon 207 is an animal icon corresponding to an animal. The object icon 208 is a vehicle icon corresponding to a vehicle.

As described above, different object icons are displayed between persons and objects (such as animals and vehicles) other than the persons in the present embodiment. For persons, different object icons are displayed between unregistered persons and registered persons. Thus, a photographer is allowed to easily grasp objects being AF-detected. For example, a photographer is allowed to easily grasp whether objects being AF-detected are any of unregistered persons, registered persons, animals, vehicles, or the like. Moreover, when a plurality of object icons corresponding to a plurality of registered persons are displayed, the plurality of object icons different from each other are displayed. For example, a plurality of object icons to which numbers different from each other are assigned are displayed like the object icons 205 and 206. Thus, the object icons of respective registered persons are made distinguishable.

Note that object icons corresponding to face organs such as pupils may be displayed as object icons different from the object icons described above. For animals, object icons may be different according to the types of animals such as dogs, cats, and birds. For vehicles, object icons may be different according to the types of vehicles such as automobiles, trains, helicopters, and airplanes. The differences between object icons corresponding to unregistered persons and object icons corresponding to registered persons may be differences in the colors, brightness, sizes, shapes, display patterns (such as display at all times and blinking display), or the like of the object icons. The differences between object icons corresponding to unregistered persons and object icons corresponding to registered persons may be differences in the types of the object icons or the presence or absence of frames surrounding the object icons, or the like. The differences between object icons corresponding to unregistered persons and object icons corresponding to registered persons may be differences in the colors, brightness, designs, or the like of frames surrounding the object icons.

When a large number of object icons are displayed, there is a possibility that the visibility of a live-view image of a main camera is impaired. Therefore, a photographer is preferably able to arbitrarily switch the display/non-display of object icons through the selection of sub-cameras. For example, the display/non-display of the object icons of sub-cameras corresponding to an AF detection icon may be switched in response to the operation of the AF detection icon. When the object items of sub-cameras corresponding to AF detection icons are displayed in response to the operation of the AF detection icons, the object items of other sub-cameras may be hidden. Thus, it is possible to display only necessary object icons and prevent the display of unnecessary object icons. Therefore, it is possible to prevent an impairment in the visibility of a live-view image of a main camera due to the display of unnecessary object icons.

Figure 3:
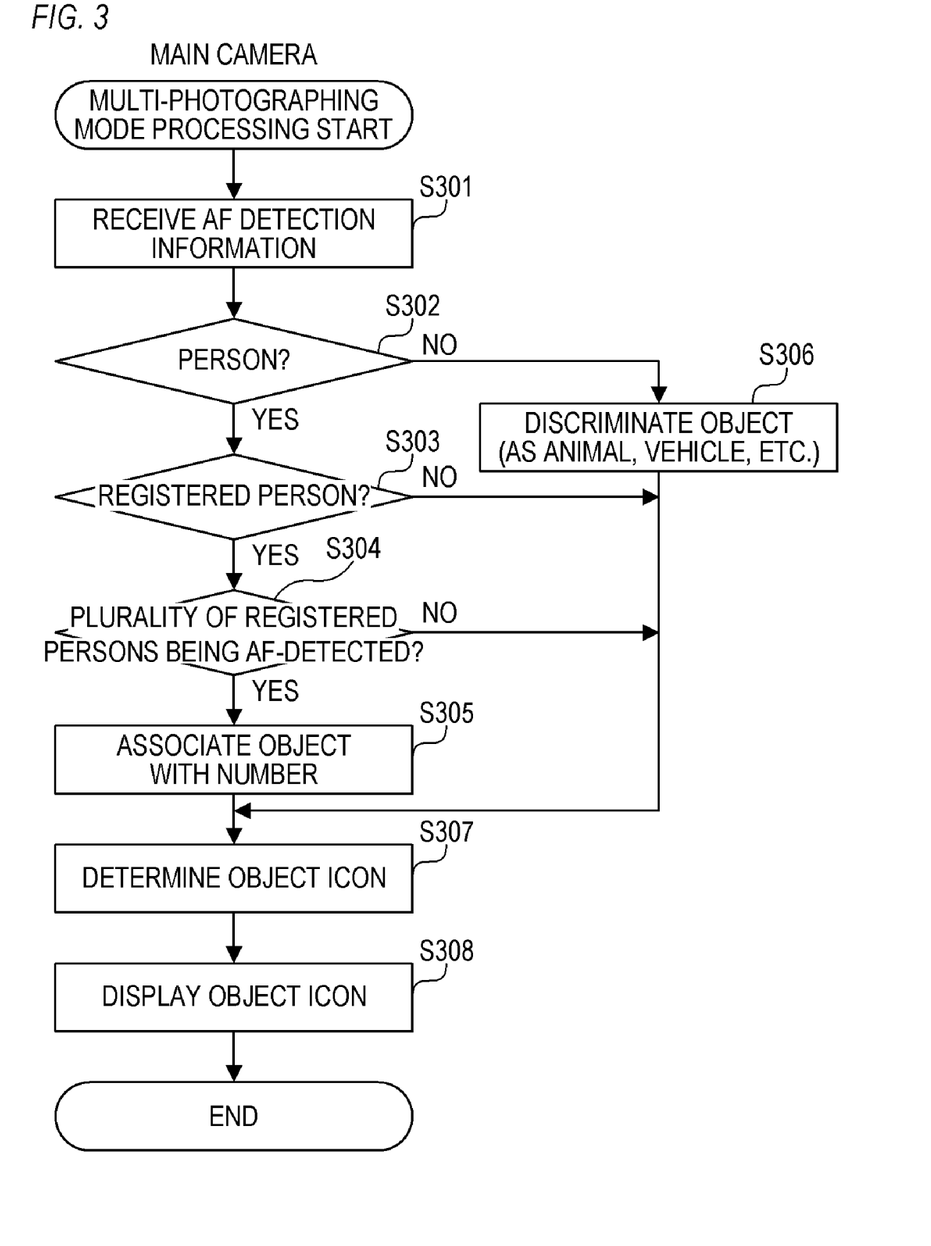
FIG. 3 is a flowchart showing an example of the multi-photographing mode processing of the main camera.

FIG. 3 is a flowchart showing an example of the operation (multi-photographing mode processing) of a main camera (the imaging apparatus 101) in a multi-photographing mode. The operation is realized when the MPU 102 develops a program recorded on the recording medium 114 into the buffer memory 107 and runs the same. For example, the operation of FIG. 3 starts when the main camera activates in a multi-photographing mode or when the mode of the main camera is switched to the multi-photographing mode. In the operation of FIG. 3, the main camera receives AF detection information on a sub-camera and displays an object icon.

The operation of FIG. 3 is performed during photographing but may be performed in a standby state for photographing.

In S301, the MPU 102 controls the reception unit 108 to receive AF detection information on a sub-camera from the sub-camera. Here, AF detection is being performed by the sub-camera, and object information associated with an object being AF-detected by the sub-camera is received as the AF detection information.

Next, the processing of S302 to S308 is performed. When a plurality of objects associated with the object information received in S301 exist, that is, when a plurality of objects are being AF-detected by the sub-camera, the processing of S302 to S308 is performed for each of the objects being AF-detected by the sub-camera. The processing of S302 to S304 and S306 is performed on the basis of the object information received in S301.

In S302, the MPU 102 controls the discrimination unit 109 to determine whether the object to be processed (the object being AF-detected by the sub-camera) is a person or an object other than the person. The processing proceeds to S303 when the object to be processed is the person. Otherwise, the processing proceeds to S306.

In S303, the MPU 102 controls the discrimination unit 109 to determine whether the object to be processed is a registered person (a person registered in advance). The processing proceeds to S304 when the object to be processed is the registered person. Otherwise (When the object to be processed is an unregistered person (a person not registered in advance)), the processing proceeds to S307.

In S304, the MPU 102 controls the discrimination unit 109 to determine whether the plurality of registered persons are being AF-detected by the sub-camera. The processing proceeds to S305 when the plurality of registered persons are being AF-detected by the sub-camera. Otherwise (When registered persons other than the object (the registered person) to be processed are not being AF-detected by the sub-camera), the processing proceeds to S307.

In S305, the MPU 102 associates the object to be processed with a number. The number is assigned to the object icon of the registered person so that the object icons of the respective registered persons are made distinguishable. The number may be included in the object information.

In S306, the MPU 102 controls the discrimination unit 109 to discriminate the object to be processed. For example, the MPU 102 discriminates the object to be processed as an animal or discriminates the object to be processed as a vehicle.

In S307, the MPU 102 controls the determination unit 110 on the basis of the discrimination result (the processing result of S302 to S306) of the discrimination unit 109 to determine object icon corresponding to the discrimination result.

In S308, the MPU 102 displays the object icon determined in S307 on the display unit 111.

Figure 4:
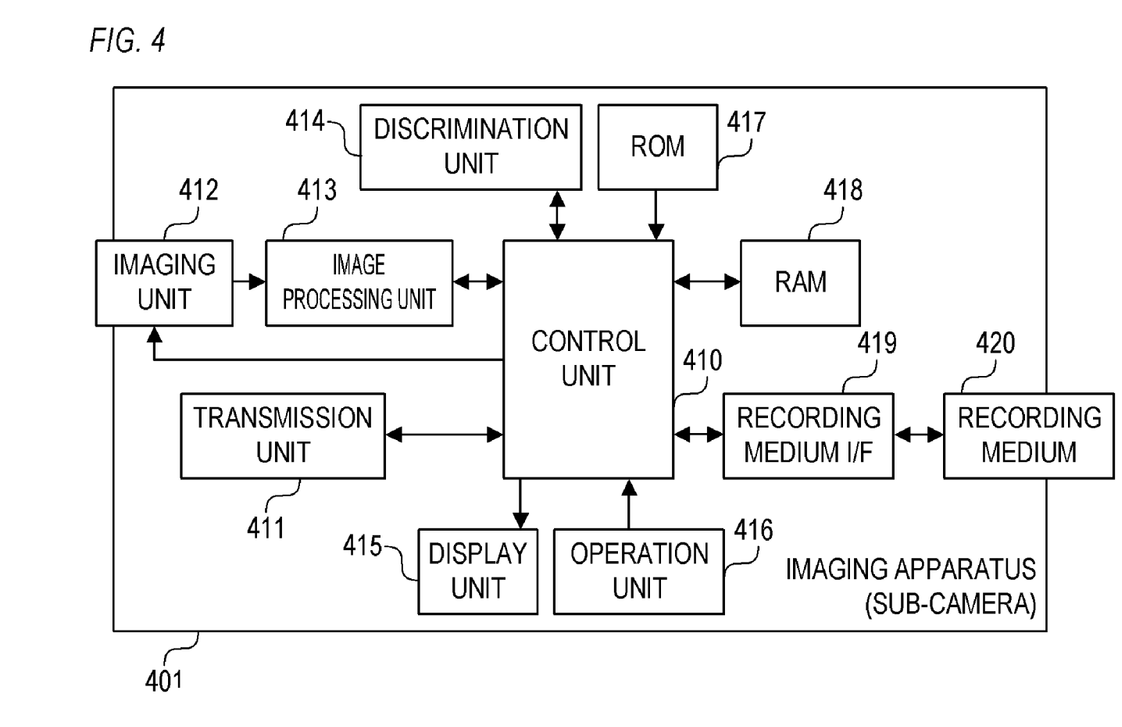
FIG. 4 is a block diagram showing a configuration example of a sub-camera.

FIG. 4 is a block diagram showing a configuration example of an imaging apparatus 401 that is a sub-camera. The imaging apparatus 401 is, for example, a camera (such as a digital camera and a digital video camera) or an electronic device including a camera function (such as a mobile phone including a camera function and a computer with a camera). The imaging apparatus 401 includes a control unit 410, a transmission unit 411, an imaging unit 412, an image processing unit 413, a discrimination unit 414, a display unit 415, an operation unit 416, a ROM 417, a RAM 418, a recording medium I/F 419, and a recording medium 420. Respective constituting units other than the control unit 410 are connected to the control unit 410, and the control unit 410 and the respective constituting unit are able to exchange data with each other.

The control unit 410 (CPU) entirely controls the imaging apparatus 401. The control unit 410 develops a program recorded on the ROM 417 into the RAM 418 and runs the same to control the respective constituting units and perform the operation of a flow chart that will be described later. The control unit 410 performs recording control on the recording medium 420, display control on the display unit 415, or the like.

The ROM 417 is a non-volatile recording medium and stores a program that is to be performed by the control unit 410. The RAM 418 is a volatile recording medium used as a work memory for the control unit 410. The RAM 418 is also used as a VRAM that temporarily stores image data that is to be displayed on the display unit 415. Moreover, the RAM 418 is also used as a storage unit that temporarily stores additional information that is to be recorded in association with the data of a captured image.

The recording medium I/F 419 is an interface to/from which the recording medium 420 for recording image data or the like is attachable/detachable. For example, the recording medium 420 is a memory card such as an SD card, and the recording medium I/F 419 has a slot to/from which the memory card is insertable/withdrawable.

The image processing unit 413 applies prescribed image processing (such as pixel interpolation processing, resize processing, and color conversion processing) to image data captured by the imaging unit 412. The imaging unit 412 has a photographing lens (including a zoom lens and a focus lens) and an imaging element, captures an object on the basis of the control of the control unit 410, and acquires image data such as still-image data and moving-image data.

The display unit 415 displays various setting statuses, an image captured by the imaging unit 412, an image read from the recording medium 420 and reproduced, or the like on the basis of the control of the control unit 410. The display unit 415 may be a look-in-type in-finder display or a rear display outside a finder. The display unit 415 may be a rear display (for example, a vari-angle system rear display) of which the posture relative to the body part of the imaging apparatus 401 is changeable, or a rear display of which the posture relative to the body part of the imaging apparatus 401 is fixed.

The operation unit 416 includes a power switch for turning ON/OFF the power of the imaging apparatus 401, a photographing start button, a mode switching button for switching an operation mode such as a camera mode (photographing mode) and a reproduction mode, or the like and receives an operation from a user. The operation unit 416 may include a touch panel.

The discrimination unit 414 determines whether AF detection is being performed on the basis of the content of AF (Auto Focus) processing performed by the imaging apparatus 401. When the AF detection is being performed, objects being AF-detected are discriminated. For example, the discrimination unit 414 discriminates whether objects are persons or objects other than the persons. The discrimination unit 414 may discriminate facial organs such as pupils, animals such as dogs, cats, and birds, vehicles such as automobiles, other objects, or the like.

The transmission unit 411 transmits information based on the discrimination result of the discrimination unit 414 to the main camera as AF detection information on the imaging apparatus 401. A transmission timing may be freely set so as not to hinder other functions (such as imaging). For example, transmission may be performed at all times, or may be performed at a timing arbitrarily designated by a photographer.

Figure 5:
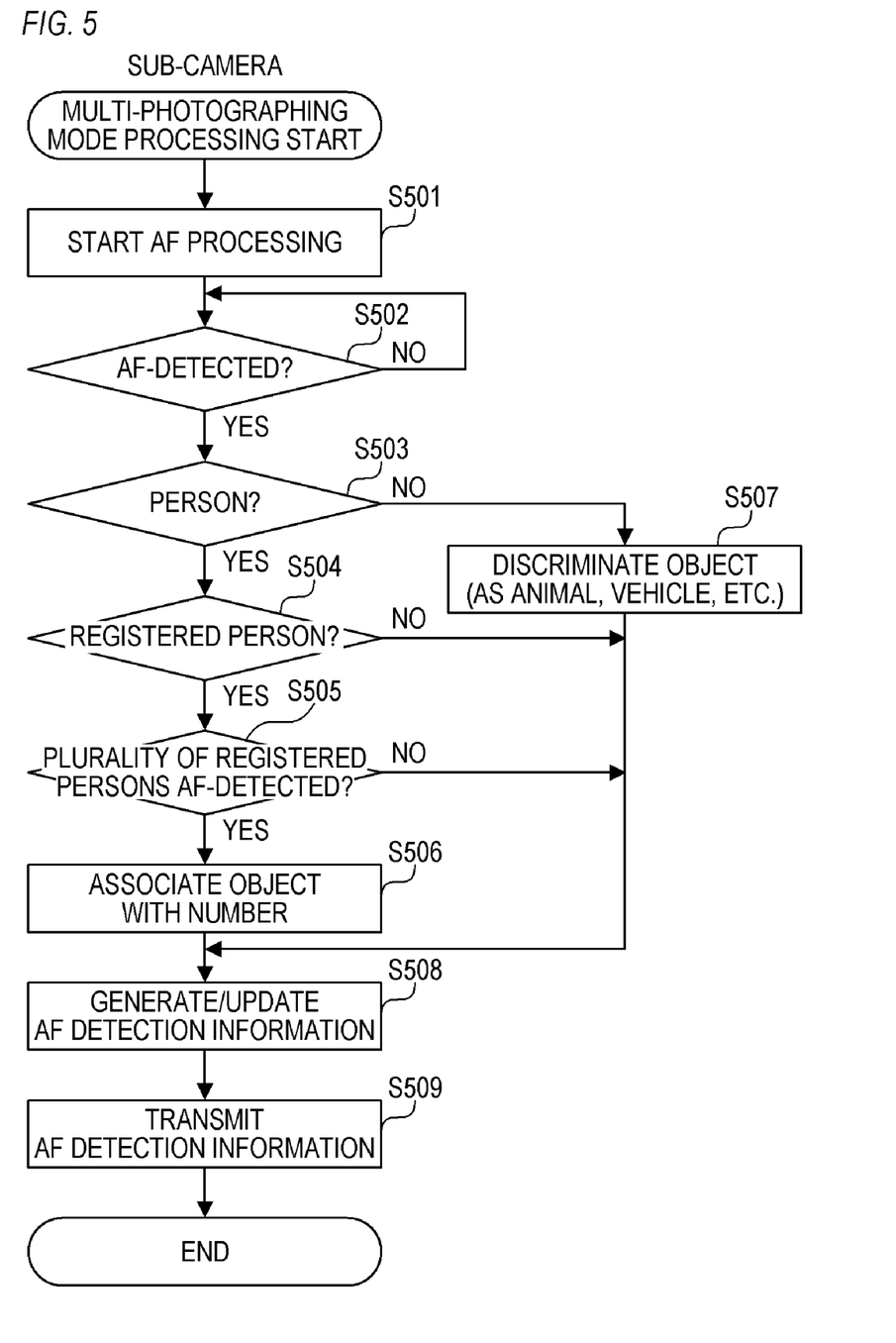
FIG. 5 is a flowchart showing an example of the multi-photographing mode processing of the sub-camera.

FIG. 5 is a flowchart showing an example of the operation (multi-photographing mode processing) of the sub-camera (the imaging apparatus 401) in a multi-photographing mode. The operation is realized when the control unit 410 develops a program recorded on the ROM 417 into the RAM 418 and runs the same. The operation of FIG. 5 starts, for example, when the sub-camera activates in the multi-photographing mode or when the mode of the sub-camera is switched to the multi-photographing mode. In the operation of FIG. 5, the sub-camera transmits its own AF detection information to a main camera. The operation of FIG. 5 is performed during photographing but may be performed in a standby state for photographing.

In S501, the control unit 410 starts AF processing.

In S502, the control unit 410 determines whether AF detection has been performed. In AF processing, an object existing in a photographing range is focused. When a plurality of objects exist in the photographing range, at least a part of the objects is focused. The processing proceeds to S503 when the AF detection has been performed. The control unit 410 repeatedly performs the processing of S502 until the AF detection has been performed.

Next, the processing of S503 to S509 is performed. When a plurality of objects are AF-detected, the processing of S503 to S508 is performed for each of the AF-detected objects. The processing of S503 to S505 and S508 is performed on the basis of the content of the AF processing.

In S503, the control unit 410 controls the discrimination unit 414 to determine whether the object (the AF-detected object) to be processed is a person or an object other than the person. The processing proceeds to S504 when the object to be processed is the person. Otherwise, the processing proceeds to S507.

In S504, the control unit 410 controls the discrimination unit 414 to determine whether the object to be processed is a registered person (a person registered in advance). The processing proceeds to S505 when the object to be processed is the registered person. Otherwise (When the object to be processed is an unregistered person (a person not registered in advance)), the processing proceeds to S508.

In S505, the control unit 410 controls the discrimination unit 414 to determine whether the plurality of registered persons are being AF-detected. The processing proceeds to S506 when the plurality of registered persons are being AF-detected. Otherwise (When registered persons other than the object (the registered person) to be processed are not being AF-detected), the processing proceeds to S508.

In S506, the control unit 410 associates the object to be processed with a number so that the respective registered persons are made distinguishable.

In S507, the control unit 410 controls the discrimination unit 414 to discriminate the object to be processed. For example, the control unit 410 discriminates the object to be processed as an animal or discriminates the object to be processed as a vehicle.

In S508, the control unit 410 generates/updates AF detection information to be transmitted on the basis of the discrimination result (the processing result of S503 to S507) of the discrimination unit 414.

In S509, the control unit 410 controls the transmission unit 411 to transmit the AF detection information to the main camera.

As described above, the main camera acquires information on objects being AF-detected by the sub-camera and displays object items corresponding to the objects being AF-detected by the sub-camera on the basis of the acquired information according to the present embodiment. Thus, when individually performing multi-photographing, a photographer is allowed to easily grasp the situation of AF detection with the sub-camera while performing photographing with the main camera. As a result, the photographer is allowed to easily perform the multi-photographing.

Note that the photographer may be able to designate the priority of AF detection about objects corresponding to object icons through the selection of the object icons displayed on the display unit 111 of the imaging apparatus 101. When the display surface of the display unit 111 is constituted by a touch panel, the priority may be intuitively designated with a touch operation on the object icons. The priority is set in the sub-camera through, for example, the control of the communication unit (the reception unit 108) by the MPU 102. After the setting of the priority, the sub-camera focuses an object having higher priority, for example, when allowed to focus only a part of two or more objects due to the movement of the object or the like in a state in which the two or more objects are being focused.

Note that the above description refers to an example in which the object icons corresponding the objects being focused by the sub-camera are displayed. However, for objects being photographed by the sub-camera, the reception unit 108 may receive information on the objects and a situation as to whether the objects are being focused by the sub-camera as AF detection information regardless of whether the objects are being focused by the sub-camera. Then, the MPU 102 may perform control, for the objects being photographed by the sub-camera, to display object items corresponding to the objects in a mode in which discrimination as to whether the objects are being focused by the sub-camera is possible on the basis of the information acquired by the reception unit 108. The situation as to whether the objects are being focused by the sub-camera may be made discriminable according to a difference in the colors, brightness, sizes, shapes, display patterns (such as display at all times and blinking display), or the like of the object icons. The situation as to whether the objects are being focused by the sub-camera may be made discriminable according to a difference in the types of the object icons, the presence or absence of frames surrounding the object icons, or the like. The situation as to whether the objects are being focused by the sub-camera may be made discriminable according to a difference in the colors, brightness, designs, or the like of frames surrounding object icon. Specifically, object icons corresponding to objects not being focused by the sub-camera may be displayed in a grayout state, or object icons corresponding to objects being focused by the sub-camera may be displayed with frames.

Thus, a user is allowed to easily grasp all the objects being photographed by the sub-camera. At this time, the user is allowed to distinguish between objects being focused by the sub-camera and the objects not being focused by the sub-camera and grasp the same. Further, the user is allowed to focus the objects not being focused by the sub-camera through the selection of the object icons and the designation of the priority of AF detection.

Note that a method for detecting objects by the sub-camera is not particularly limited. For example, after detecting focused objects to be made discriminable, the objects may be continuously detected by tracking processing or the like. After detecting the focused objects to be made discriminable, it may be possible to regard the objects as being photographed.

According to the present disclosure, multi-photographing is easily performed by an individual.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-177841, filed on Oct. 29, 2021, which is hereby incorporated by reference herein in its entirety.

What is claimed is:

1. An imaging apparatus comprising:
   an image sensor; and
   at least one memory and at least one processor which function as:
   an acquisition unit configured to acquire information related to an object being focused by an external imaging apparatus; and
   a control unit configured to perform, on a basis of the information acquired by the acquisition unit, control to superimpose and display an object icon that a type of the object being focused by the external imaging apparatus is identifiable by itself, on a live-view image captured by the image sensor, wherein
   the control unit performs control to superimpose and display the object icon on the live-view image based on the information on the object focused in an image captured by the external imaging apparatus, not based on an object included in the live-view image.

2. The imaging apparatus according to claim 1, wherein the acquisition unit acquires, for an object being photographed by the external imaging apparatus, information related to the object and a situation as to whether the object is being focused by the external imaging apparatus regardless of whether the object is being focused by the external imaging apparatus, and the control unit performs control, for the object being photographed by the external imaging apparatus, to superimpose and display an object icon corresponding to the object in a mode in which discrimination as to whether the object on the live-view image is being focused by the external imaging apparatus is possible on a basis of the information acquired by the acquisition unit.

3. The imaging apparatus according to claim 2, wherein the control unit performs control to superimpose and display an object icon having a different color or size between an object being focused by the external imaging apparatus and an object not being focused by the external imaging apparatus, on the live-view image.

4. The imaging apparatus according to claim 1, wherein the control unit performs control to superimpose and display a different object icon between a person and an object other than the person, on the live-view image.

5. The imaging apparatus according to claim 1, wherein the control unit performs control to superimpose and display a different object icon between an unregistered person and a registered person, on the live-view image.

6. The imaging apparatus according to claim 1, wherein the control unit performs control to superimpose and display a plurality of object icons different from each other as a plurality of object icons corresponding to a plurality of registered persons, on the live-view image.

7. The imaging apparatus according to claim 1, wherein the control unit performs control to superimpose and display a different object icon between a dog, a cat, a bird, an automobile, and a pupil, on the live-view image.

8. The imaging apparatus according to claim 1, wherein the control unit further performs, on a basis of the information acquired by the acquisition unit, control to superimpose and display a status item showing whether the object being focused by the external imaging apparatus exists, on the live-view image.

9. The imaging apparatus according to claim 8, wherein the control unit performs control to superimpose and display the object icon on the live-view image, on a basis of the information acquired from the external imaging apparatus, in response to operation of the status item.

10. The imaging apparatus according to claim 8, wherein the acquisition unit acquires information from a plurality of external imaging apparatuses, and the control unit performs control to superimpose and display a plurality of status items corresponding to the plurality of external imaging apparatuses on the live-view image, and in a case where any of the plurality of status items is operated, the control unit performs control to superimpose and display an object icon on the live-view image on a basis of information acquired from an external imaging apparatus corresponding to an operated status item, and not to display object icons related to other external imaging apparatuses.

11. The imaging apparatus according to claim 1, wherein the external imaging apparatus is an imaging apparatus installed at a position different from a position at which the imaging apparatus installed.

12. A control method of an imaging apparatus including an image sensor, comprising:

an acquisition step of acquiring information related to an object being focused by an external imaging apparatus; and a control step of performing, on a basis of the information acquired in the acquisition step, control to superimpose and display an object icon that a type of the object being focused by the external imaging apparatus is identifiable by itself, on a live-view image captured by the image sensor, wherein in the control step, control is performed to superimpose and display the object icon on the live-view image based on the information on the object focused in an image captured by the external imaging apparatus, not based on an object included in the live-view image.

13. A non-transitory computer readable medium that stores a program, wherein the program causes a computer to execute a control method of an imaging apparatus including an image sensor, the control method comprising:

an acquisition step of acquiring information related to an object being focused by an external imaging apparatus; and a control step of performing, on a basis of the information acquired in the acquisition step, control to superimpose and display an object icon that a type of the object being focused by the external imaging apparatus is identifiable by itself, on a live-view image captured by the image sensor, wherein in the control step, control is performed to superimpose and display the object icon on the live-view image based on the information on the object focused in an image captured by the external imaging apparatus, not based on an object included in the live-view image.

* * * * *